United States Patent
Koskinen

(10) Patent No.: US 6,764,257 B2
(45) Date of Patent: Jul. 20, 2004

(54) TOOL FOR MILLING, A MILLING BODY AND METHOD FOR MILLING

(75) Inventor: Jorma Koskinen, Fagersta (SE)

(73) Assignee: Seco Tools AB, Fagersta (SE)

(*) Notice: Subject to any disclaimer, the term of this patent is extended or adjusted under 35 U.S.C. 154(b) by 0 days.

(21) Appl. No.: 10/314,187

(22) Filed: Dec. 9, 2002

(65) Prior Publication Data

US 2003/0129033 A1 Jul. 10, 2003

(30) Foreign Application Priority Data

Dec. 7, 2001 (SE) .............................................. 0104158

(51) Int. Cl.[7] .................................................. B23C 5/00
(52) U.S. Cl. ............................ 409/63; 409/59; 409/43; 409/48; 409/63; 407/12; 407/35; 407/40
(58) Field of Search ............................... 407/63, 59, 43, 407/48, 12; 409/132, 244, 282, 287, 262

(56) References Cited

U.S. PATENT DOCUMENTS

| | | | | |
|---|---|---|---|---|
| 1,126,107 A | * | 1/1915 | Simmons | 407/53 |
| 2,231,747 A | * | 2/1941 | Bauer | 409/1 |
| 2,267,182 A | * | 12/1941 | Wildhaber | 407/29 |
| 2,271,753 A | * | 2/1942 | Wildhaber | 407/29 |
| 3,811,163 A | * | 5/1974 | Frederick et al. | 409/132 |
| 4,529,338 A | * | 7/1985 | Erkfritz | 407/35 |
| 4,790,693 A | * | 12/1988 | Koblesky | 407/35 |
| 5,037,248 A | * | 8/1991 | Heffron | 407/12 |
| 5,071,292 A | | 12/1991 | Satran | |
| 5,120,166 A | * | 6/1992 | Woerner | 407/12 |
| 5,542,793 A | * | 8/1996 | Deiss et al. | 407/35 |
| 5,820,308 A | * | 10/1998 | Hoefler | 407/40 |
| 5,890,854 A | * | 4/1999 | Naumann et al. | 409/132 |
| 5,911,548 A | * | 6/1999 | Deiss et al. | 409/234 |
| 5,931,612 A | * | 8/1999 | Basstein | 407/12 |

FOREIGN PATENT DOCUMENTS

| | | | | |
|---|---|---|---|---|
| DE | 674 112 | 4/1939 | | |
| DE | 29 51 497 | 7/1981 | | |
| EP | 0 392 729 | 10/1990 | | |
| RU | 132 3255 | 7/1987 | | |
| RU | 147 9210 | 5/1989 | | |
| SU | 837608 B | * 6/1981 | | B23C/5/06 |
| SU | 996106 A | * 2/1983 | | B23C/5/06 |
| SU | 1757791 A1 | * 8/1992 | | B23C/5/06 |

* cited by examiner

Primary Examiner—A. L. Wellington
Assistant Examiner—Dana Ross
(74) Attorney, Agent, or Firm—Burns, Doane, Swecker & Mathis, L.L.P.

(57) ABSTRACT

A milling tool includes a milling body and a plurality of cutting inserts. The milling body has fastening devices to hold the cutting inserts in a plurality of respective insert pockets each having at least one base surface. Each of the cutting inserts has at least one cutting edge. The tool has a rotational axis and a rotational direction, as well as a feed direction and an end surface. The milling tool is provided to cut a work piece substantially in an axial direction of the tool, which is substantially perpendicular to the feed direction.

8 Claims, 7 Drawing Sheets

TOOL FOR MILLING, A MILLING BODY AND METHOD FOR MILLING

This application claims priority under 35 U.S.C. §119 to Patent Application Serial No. 0104158-1 filed in Sweden on Dec. 7, 2001.

1. Area of the Invention

The present invention relates to a tool for milling, a milling body and method for milling, wherein cutting inserts are mounted in respective pockets spaced apart around an outer periphery of a rotary milling body.

2. Prior Art

At milling, the principle for metal machining comprises a coordinated motion of a rotary multi-edged tool relative to a rectilinearly fed work piece. Alternatively the tool can be fed towards the work piece in substantially any direction. The milling tool has several cutting edges and each cutting edge removes a certain amount of metal.

At face milling, the machining is primarily done by the cutting edges at the circumferential periphery of the tool, but to some extent also by the minor cutting edges at the axial end surface of the tool. The cutting depth in the radial direction is determined by how deeply the cutting edges cut at the periphery. The minor cutting edges at the end surface of the tool generate the finished surface. A drawback of a prior face-milling cutter is that only a little part of each cutting edge is active to perform the cutting (i.e., to absorb the reactive forces), so the wear during face milling is rapid (resulting in shorter life span) as well as frequently requiring longer time of engagement with the work piece. In addition, frequently edge breakages occur at machining of brittle work pieces.

OBJECTS OF THE INVENTION

One object of the invention is to provide an improved milling tool for face milling.

One further object of the present invention is to provide a milling tool for face milling at which each cutting edge of a cutting insert can be better utilized.

Another object of the present invention is to provide a milling tool for face milling at which the cutting inserts obtain a longer life span.

Still another object of the present invention is to provide a milling tool for face milling that requires relatively few passes over the work piece for each cutting insert.

Still another object of the present invention is to provide a milling tool and a method for face milling, wherein the bordering edges of the work piece break less frequently.

Still another object of the present invention is to provide a milling tool for face milling at which certain machining data, at least the axial feed, are predetermined by the geometry of the tool.

Still another object of the present invention is to provide a milling tool for face milling at which the resultant cutting forces favors machining in weak machines as well as simplifies fixing of the work piece.

SUMMARY OF THE INVENTION

These and other objects have been achieved by a tool for face milling comprising a milling body which defines an axis of rotation and an axial end surface. The tool also comprises a plurality of cutting inserts carried by the body. The body includes circumferentially spaced pockets in which respective inserts are mounted. Each pocket comprises at least one base surface. Each insert has at least one cutting edge. The milling tool is arranged to cut a work piece substantially in the axial direction which is perpendicular to a feed direction.

Another aspect of the invention relates to a milling body for a milling tool which comprises a plurality of pockets adapted to receive respective cutting inserts. Each pocket includes at least one base surface. The body defines an axis of rotation. The pockets are arranged along at least one path extending helically with respect to the rotational axis. The path forms a pitch angle relative to a plane extending perpendicularly to the rotational axis.

Another aspect of the invention relates to a method of milling a work piece utilizing a milling tool which comprises a milling body and a plurality of cutting inserts carried by the body. The body defines an axis of rotation and includes circumferentially spaced pockets in which respective inserts are mounted. Each pocket comprises at least one base surface. Each insert has at least one cutting edge. The method comprises the steps of rotating the body about the axis while producing a relative feed between the body and the work piece in a direction perpendicular to the axis, and machining the work piece substantially in the axial direction.

BRIEF DESCRIPTION OF THE DRAWINGS

The objects and advantages of the invention will become apparent from the following detailed description of preferred embodiments thereof in connection with the accompanying drawing in which like numerals designate like elements, and in which.

DESCRIPTION OF PREFERRED EMBODIMENTS OF THE INVENTION

Figure 1A:
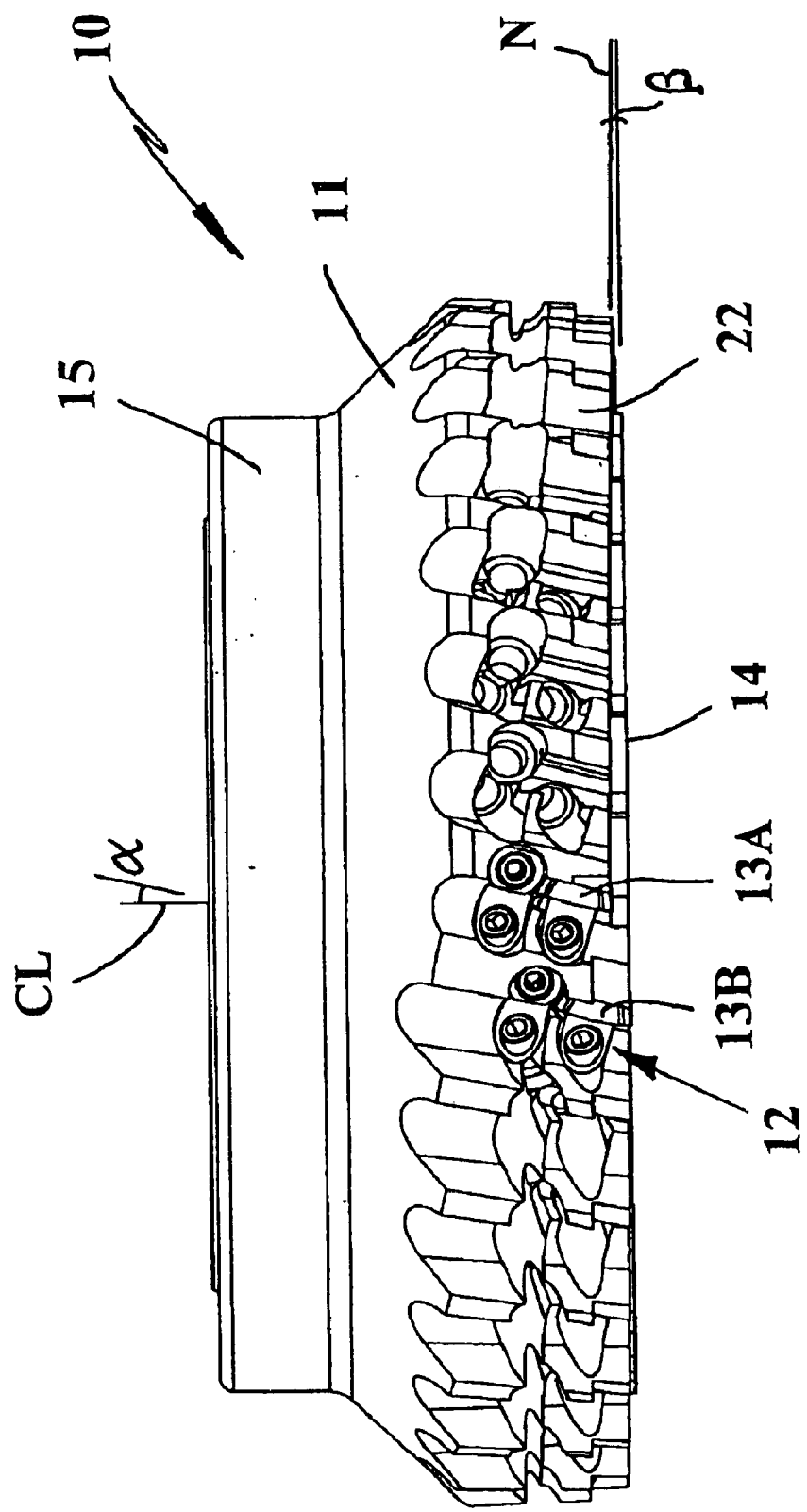
FIG. 1A shows an embodiment of a tool for face milling according to the present invention in a side view.
Figure 1B:
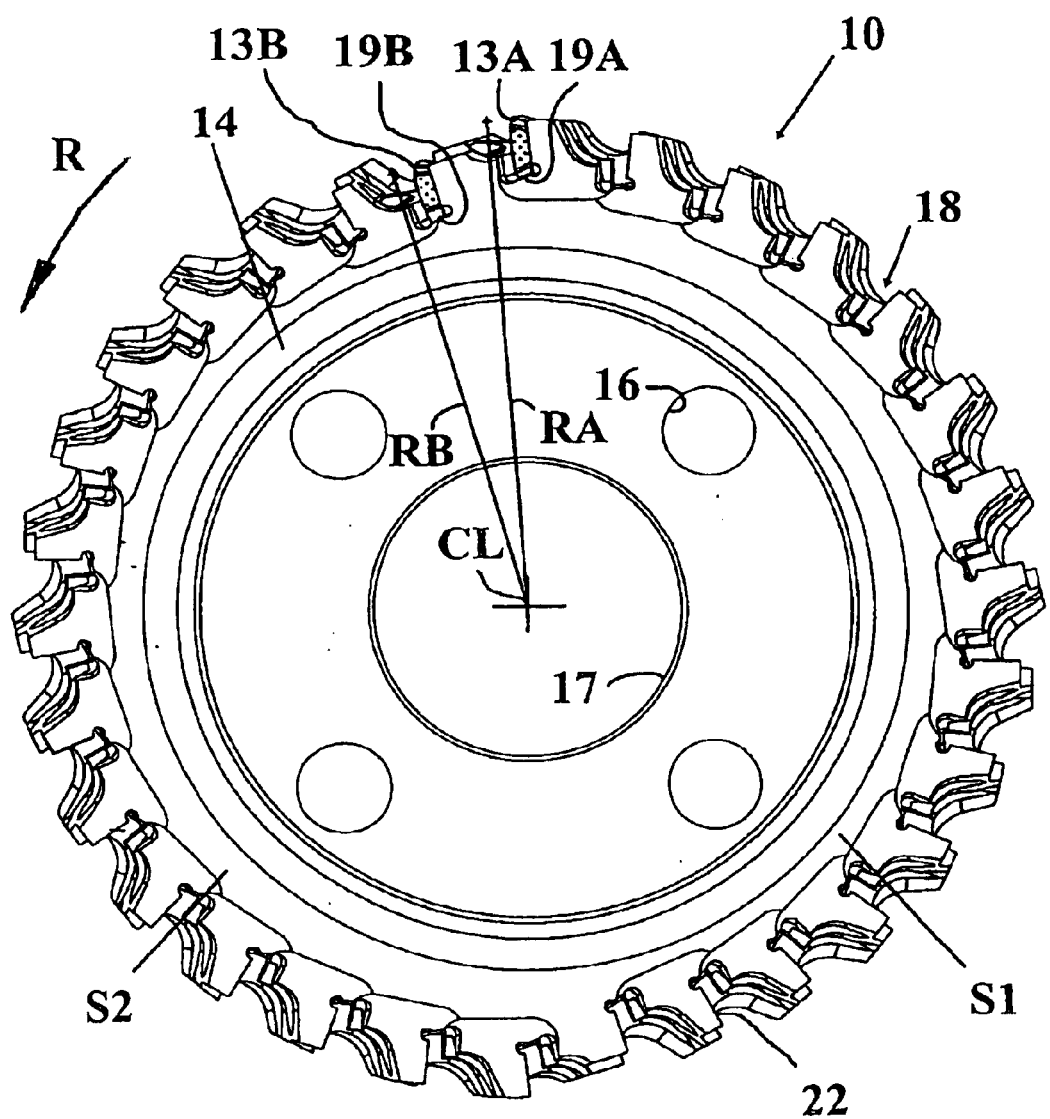
FIG. 1B shows the tool in a bottom view.
Figure 1C:
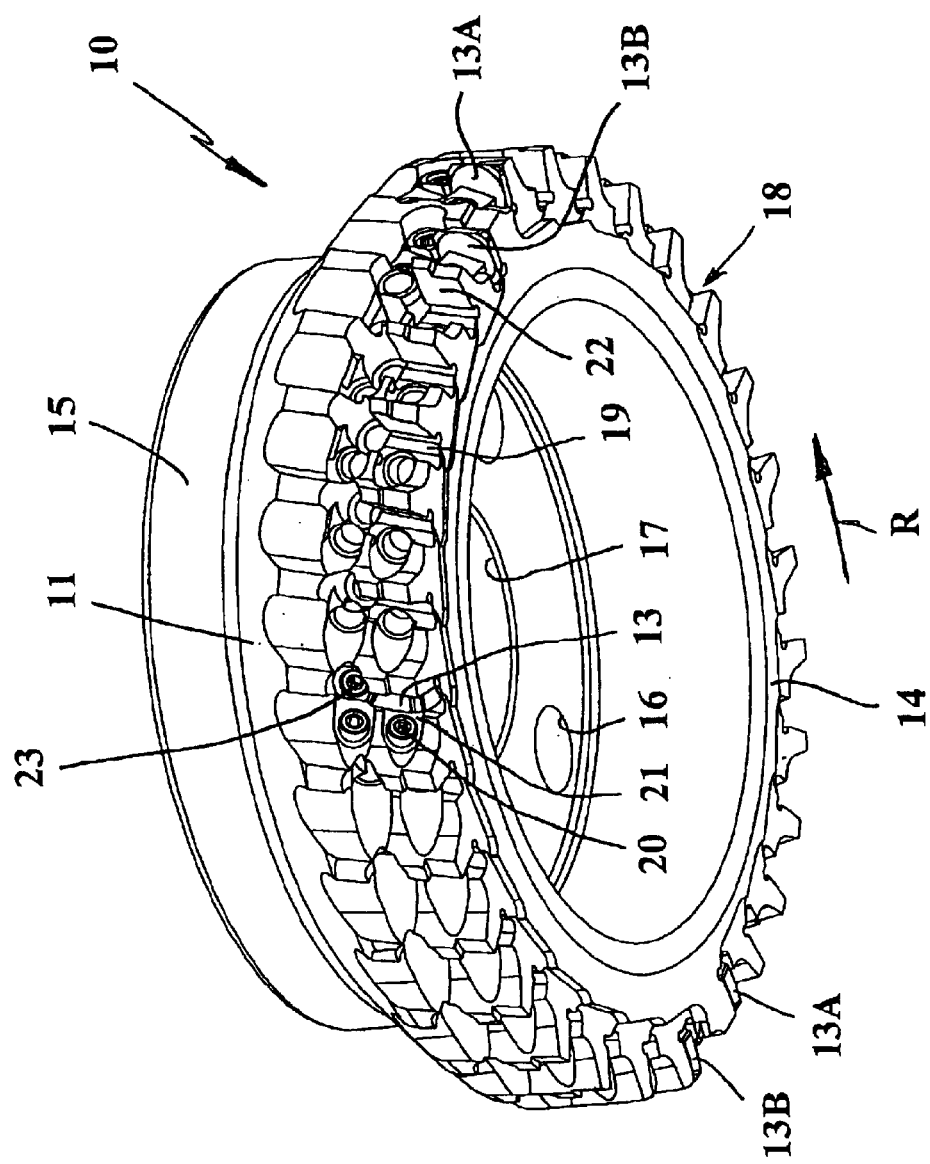
FIG. 1C shows the tool in a perspective view.

FIGS. 1A–1C show a tool 10 for face milling according to the present invention. The tool 10 comprises a milling body 11 preferably made of steel; a number of fastening means 12 (e.g., screws) as well as a number of indexable cutting inserts 13, 13A, 13B. The milling body 11 has a circular basic shape and comprises an end surface 14 facing axially forwardly, a mounting portion 15 with four fastening holes 16 arranged about a center hole 17 as well as a peripheral wreath of adjustable insert pockets 18 for receiving identical cutting inserts 13, 13A, 13B. Each pocket is intended to receive an indexable cutting insert (although only a few of the cutting inserts are shown in FIGS. 1A–1C). Each pocket comprises a primarily planar base surface 19 (e.g., see the two base surfaces 19A, 19B shown in FIG. 1B). A first threaded boring is provided in front of the base surface in the direction of rotation R to receive a fastening screw 20 for forcing the cutting insert by means of a wedge 21 against a shoulder or a support surface 22 and the base surface 19. The support surface 22 forms an acute axial angle α with the rotational axis CL of the tool (see FIG. 1A). A similar wedge joint is provided above the wedge 21 for wedging a releaseable axial support device 23, which determines the axial position of the cutting insert 13.

Figure 2:
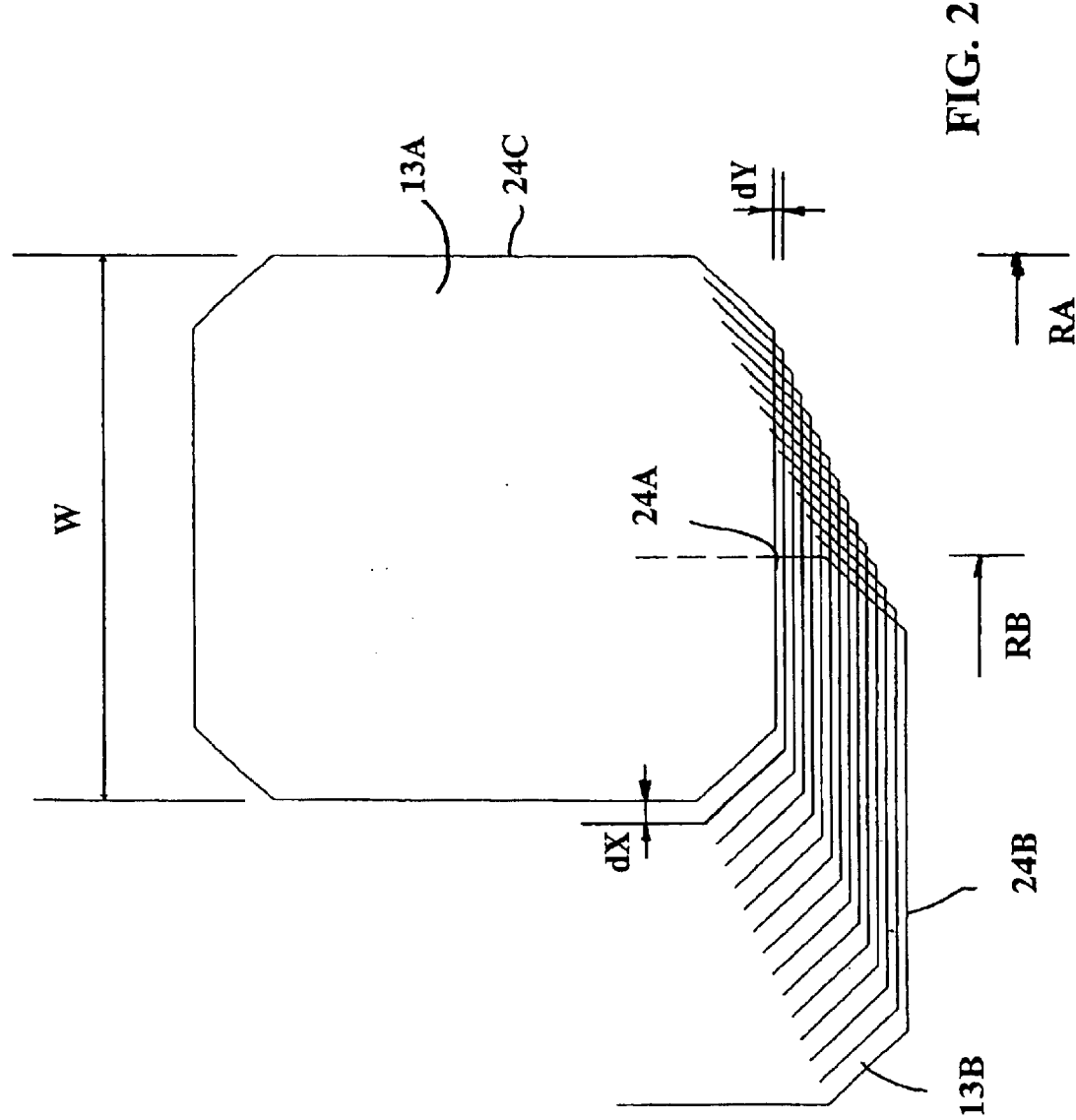
FIG. 2 schematically shows how the indexable cutting inserts are arranged in the tool.

Each cutting edge includes a plurality of cutting edges each of which can be indexed into an active radial position (.e.g, see the radial edges 24A, 24B in FIG. 2). When the cutting insert shall be indexed, the screw 20 is partly untightened until the cutting insert can be drawn by hand radially and/or axially outwardly and the cutting insert can be rotated in ninety degree steps such that a fresh radially directed cutting edge (e.g., 24A, 24B) comes into active position, see FIG. 2. Then the cutting insert is pushed into the pocket and the screw is tightened again. The cutting inserts 13 shall be located in the milling body with a setting angle about 90°, such that the cutting edge 24A, 24B becomes essentially orthogonal to the rotational axis CL. The cutting insert 13 has, in the shown embodiment, straight symmetrical corner bevels, which alternatively can be replaced by rounded corner bevels if desired.

The tool circumference has two halves. The base surfaces 19 are, in each half circumference, arranged at successively diminishing radial distances from the rotational axis CL in a direction opposite the rotational direction R of the tool as represented by segments S1, S2 in FIG. 5. The base surfaces 19 are furthermore simultaneously arranged at successively diminishing distances from the end surface 14 or from a plane N disposed parallel to and below the end surface 14 (or from a plane perpendicular to the rotational axis CL facing towards the end surface 14). This means that each mounted cutting insert 13, except for the first cutting insert 13A, during a half revolution (when observed with the rotational axis CL in one and the same position) is displaced radially inwards a distance dX, see FIG. 2, and axially forwards a distance dY, relative to an antecedent cutting insert in the same segment S1 or S2 in the direction of rotation R.

The cutting inserts 13, 13A, 13B are identical and have a substantially quadrangular or square basic form and comprise an upper abutment surface, a bottom surface and an edge surface substantially connecting the upper surface and the bottom surface. The cutting insert has a positive geometry, and the edge surface defines a clearance surface that forms an acute angle with the upper surface, while the latter forms a chip surface. The upper surface may include a chip-upsetting surface positioned at the periphery of the cutting insert. The upper surface may slope inwardly and downwardly from the chip-upsetting surface. The cutting insert is made from pressed and cemented hard metal. By "hard metal" is here meant TC (tungsten carbide), TiC, TaO, NbC, or similar, in cemented combination with a binder metal such as for example Co or Ni. Alternatively, cutting inserts of cubic boron nitride CBN, diamond POD or ceramics can be used. The cutting inserts in a segment S1, S2 are arranged substantially along a pitch that in a side view forms a pitch angle β of about 2–20° with the plane N that is oriented normal to the rotational axis CL.

Figure 3:
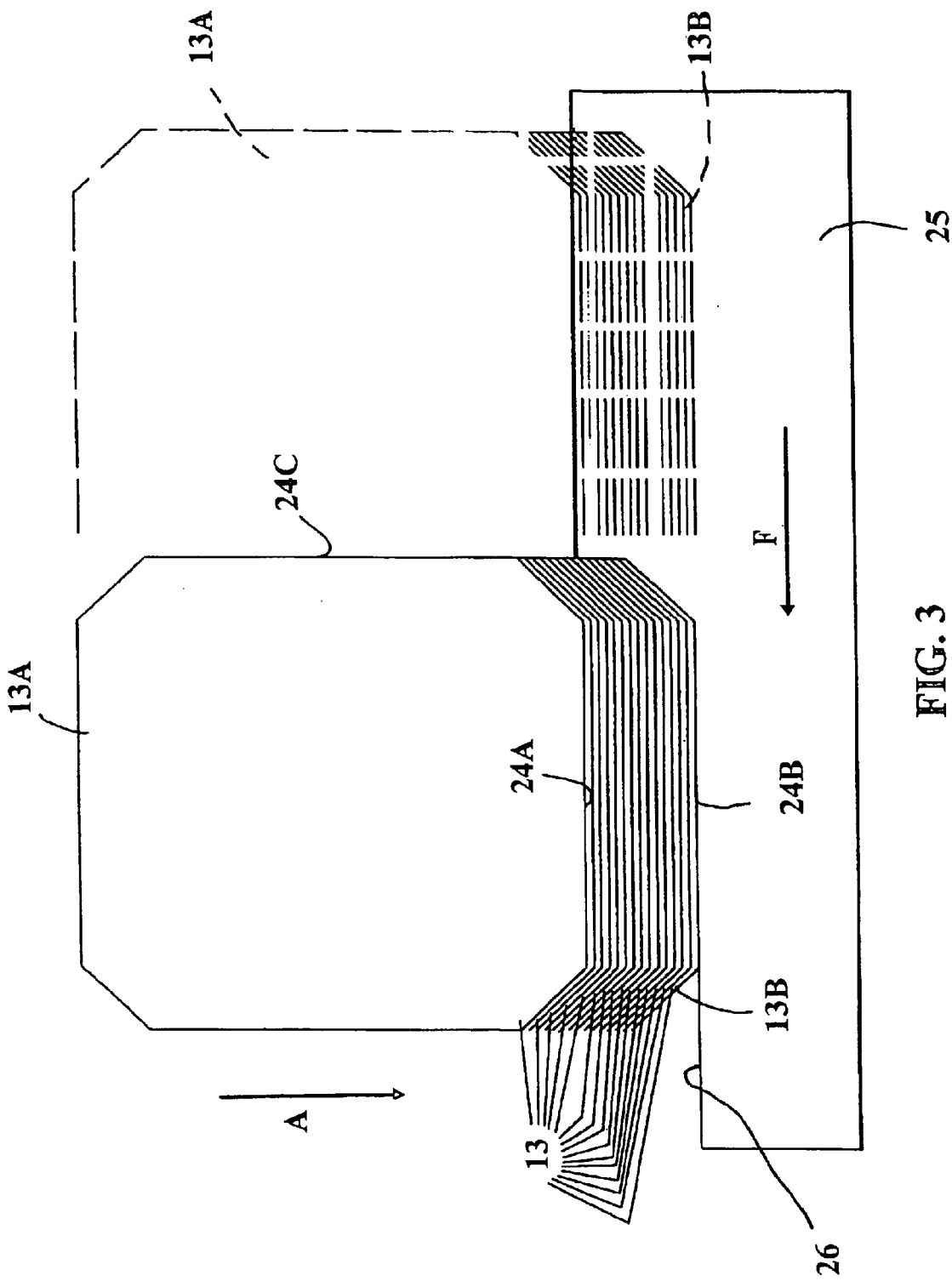
FIG. 3 schematically shows how the indexable cutting inserts in the tool work during an entire revolution in a work piece.

With reference to FIG. 3 is hereinafter explained the mode of operation of the tool 10. In the figure is schematically shown how the indexable cutting inserts 13A, 13B in the tool work on a work piece 25 when the tool is rotated by 360°, i.e. a full revolution, from an initial position. The cutting insert 13A is the first indexable cutting insert in engagement with the work piece. The machining during that full revolution occurs in two steps which are illustrated with solid lines for the first segment S1 and with dashed lines for the second segment S2. The tool 10 is intended to cut substantially only in the axial direction A, i.e. in a direction parallel to the rotational axis CL of the tool, despite the work piece being continuously displaced in the feed direction F with a specially adapted feed speed. The feed per cutting insert ("$f_2$" in mm) is equal to each distance dX ("$a_e$" mm) such that each cutting insert retains its radial position relative to the work piece. The feed speed ("$v_f$" mm/min) is chosen equal to the aggregate value of the distances dX during a time period for the utilized number of revolutions for the spindle.

The feed speed is $v_f = S*z*n*dX$ mm/min where S is the number of segments, z is the number of cutting inserts in the segment, for example 12 pieces, n is the number of revolutions (rpm) of the spindle and dX is the radial distance in mm between two consecutive cutting inserts in a segment S1, S2. That is, optimum feed is attained when $f_z$ is equal to the radial distance dX between two consecutive cutting inserts. The first (leading) cutting insert 13A in one segment S1, S2 in the direction of rotation R is provided at a greatest distance RA from the rotational axis CL, and the last trailing cutting insert 13B in the segment S1, S2 is provided at a shortest distance RB from the rotational axis CL. The cutting insert 13, 13A, 13B has a width W (see FIG. 2), and the difference between the greatest distance RA and the shortest distance RB is smaller than the width W of the cutting insert. The axial distance dY between two adjacent cutting inserts 13 is preferably equal within each segment S1, S2, however with the reservation that any cutting insert can be chosen to act as a finishing insert with a smaller axial cutting depth. The radial distance dX between two adjacent cutting inserts 13 is preferably equal along the respective segment.

Since the tool during a part of a revolution machines an area of the work piece 25 with a limited radial extension, each cutting insert 13 will plunge-cut axially the distance dY ("$a_p$" mm) at each cutting insert by means of the cutting edge 24. When the machining by the last cutting edge 24B of the cutting insert 13B is done, a generated abutment surface 26 is obtained (see FIG. 3). Subsequently, the next cutting insert 13A will engage the work piece at a location spaced by a distance W (i.e. by an insert width) radially beyond the most recent engagement, such as shown with dashed lines to the right in FIG. 3, and thereby the above-described process is repeated. With correctly adjusted feed values and number of revolutions (rpm) the radially outermost cutting edge 24C on each mounted cutting insert will not cut any chips. Said cutting edge 24C is consequently saved for later indexing to an active position. However, the cutting edge 24A cuts chips of constant thickness. By this method at least 60% of the cutting edge 24A, preferably 75–100%, is used. The latter value applies for cutting edges if the nose radius is neglected and if correctly adjusted feed values and number of revolutions are chosen.

The special method of plunge-cut milling according to the present invention entails among other things that breakages of the bordering edges of the work piece, for example a brittle engine block of cast-iron, normally do not happen since the milling tool does not create large radial forces.

Figure 4B:
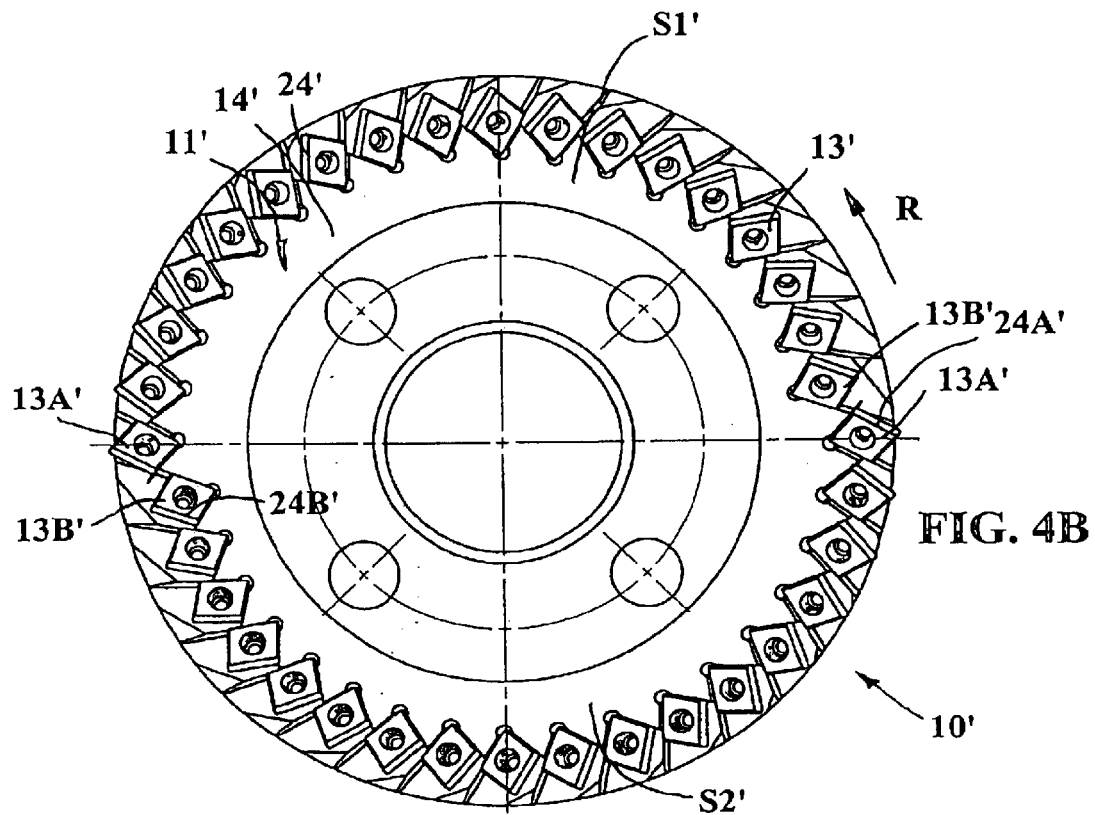
FIG. 4B shows the tool of FIG. 4A in a bottom view.
Figure 4A:
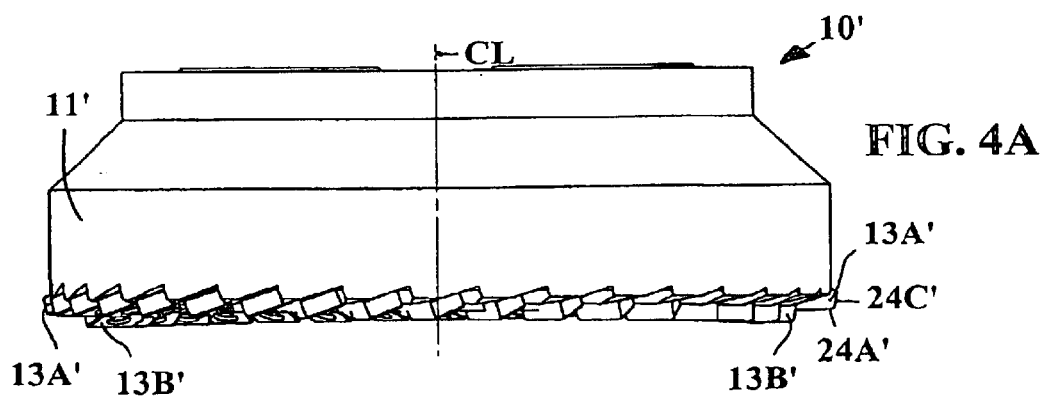
FIG. 4A shows an alternative embodiment of a tool for face milling according to the present invention in a side view.

FIGS. 4A and 4B show an alternative embodiment of a milling tool 10' for face milling according to the present invention. This tool has integrated insert pockets with tangentially mounted cutting inserts 13', 13A', 13B'. The cutting inserts are consequently mounted with their greatest abutment surfaces flat against the milling body. Thereby no separate chip spaces for each cutting insert are needed, and therefor the cutting inserts can be placed close to each other and thereby, a close-edged milling tool is obtained. The shown cutting inserts in the milling tool 10' have been mounted with negative axial angle. The shown tool 10' has thirty-six indexable cutting inserts divided among two helical segments S1', S2'. The cutting insert 13', 13A', 13B' has a cutting edge 24', 24A', 24B', which substantially coincides with the surface facing away from said corresponding greatest surface. Said cutting edge forms a negative radial angle with a normal to the rotational axis CL of the tool. The cutting insert 13A', 13B' also has a substantially axially directed, passive cutting edge 24C'. As described above, the cutting inserts 13 in each segment S1', S2' are provided along a helical path. The cutting inserts in a segment S1', S2' are arranged substantially along a pitch which in a side view forms a pitch angle about 2–20° with a normal to the rotational axis CL.

The cutting inserts 13, 13' are consequently arranged at successively diminishing distances from a plane of the end surface 14' or from a plane oriented parallel to and below the end surface 14' or from a plane perpendicular to the rotational axis CL facing towards the end surface 14'. This means that each mounted cutting insert 13 during a half revolution (when observed with the rotational axis CL in one and the same position) is displaced radially inwards a distance dX, see FIG. 2, and axially forwards a distance dY relative to an antecedent cutting insert in same segment in the direction of rotation R.

The mode of operation of the milling tool 10' is essentially the same as the above-described tool 10. The indexable cutting inserts 13'. 13A', 13B' in the milling body 11' in a segment S1', S2' work along a helical path when the tool is rotated about 180°, i.e. a half revolution, in a work piece from an initial position with the cutting insert 13A' as the first indexable cutting insert in engagement and the cutting insert 13B' as the last indexable cutting insert in engagement within the segment S1', S2'. The cutting inserts in a segment S1', S2' are, like above, also arranged with successive axial spacing between two adjacent cutting inserts. The tool 10' is intended to cut in substantially only the axial direction while the work piece continuously is displaced in the feed direction F with a specially adapted feed speed.

Figure 5:
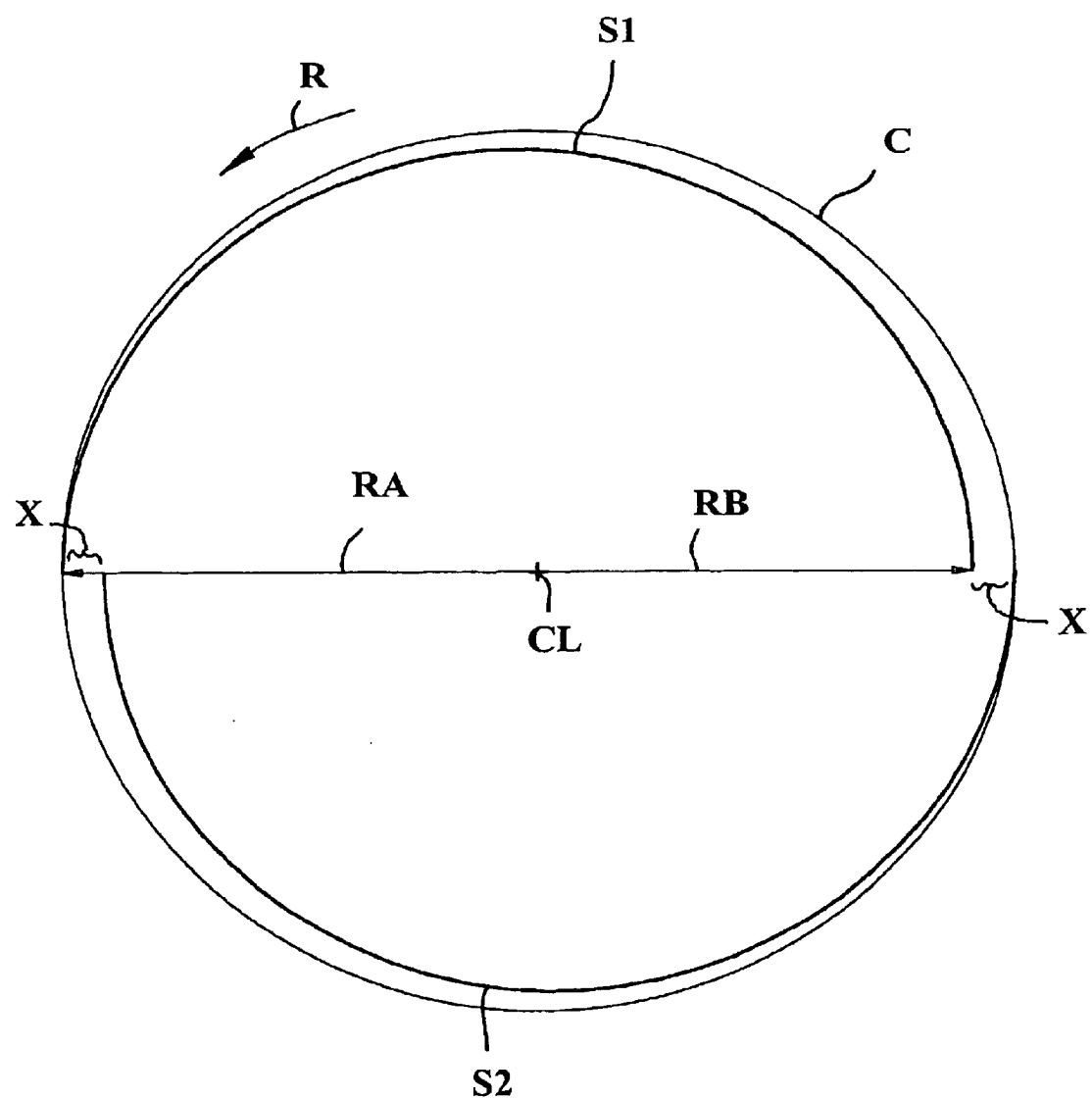
FIG. 5 shows a schematical bottom view of how the cutting inserts are arranged along a helical path in a milling tool.

FIG. 5 schematically shows, in a bottom view, how the cutting inserts are arranged along a helical path within each segment S1, S2 in both milling tools 10, 10'. In the figure a circle C defines the greatest circular path with radius RA of the first cutting insert 13A in the direction of rotation R. All cutting inserts 13 or 13' within a segment S1, S2 form corresponding circles, but with smaller diameters. Each cutting insert which follows the first cutting insert 13A within a segment S1, S2 is provided at a successively shorter radial distance from the rotational axis CL or successively greater radial distance from the circle C the closer the last cutting insert 13B measurement is done. The difference X between the radius RA for the outermost cutting insert 13A and the radius RB for the innermost cutting insert 13B is, as mentioned, shorter than the width W of the cutting insert. The feed per revolution consequently becomes substantially two times X. The cutting inserts in a segment S1, S2 are, as mentioned above, also arranged with successive axial spacing between two adjacent cutting inserts, i.e. substantially along a pitch which in a side view forms a pitch angle β of about 2–20° with a normal N to the rotational axis CL.

With a milling tool according to the present invention the entire cutting edge 24, 24A, 24B can be utilized simultaneously while the passive cutting edge 24C of each cutting insert is saved for later use upon being indexed to an active position. This gives greater machining speed, a more favorable life span for the cutting inserts, as well as requiring relatively few passes. It is naturally possible to utilize more or fewer segments S1, S2 than the ones described. In addition negative cutting insert may be used in insert pockets adapted thereto. Even if the tool is intended to work in the axial direction only, it can in some cases be desirable to position the insert pockets and cutting inserts such that they also work somewhat in the radial direction to further increase removal. In the latter case, however, at least 90% of the chip volume will be cut by radially directed cutting edges 24A, 24B. It is conceivable to combine integrated insert pockets with adjustable insert pockets in one and the same milling body.

Since the resultant cutting forces are directed axially upwards into the spindle of the machine machining in weak machines is promoted and also the requirements regarding fixing of the work piece are reduced.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A milling tool comprising a milling body defining an axis of rotation, and a front axial end surface, and a plurality of cutting inserts carried by the body; the body including circumferentially spaced pockets in which respective inserts are mounted; each pocket comprising at least one base surface; each insert having at least one cutting edge; the milling tool arranged to cut a work piece substantially in the axial direction which is perpendicular to a feed direction, wherein the inserts are arranged in a plurality of segments, the segments arranged successively in a first circumferential direction of the body, each segment comprising more than two circumferentially successive inserts and including a leading insert and a last trailing insert with reference to the direction of rotation, the inserts of each segment becoming disposed gradually radially inwardly in the first circumferential direction of the body and gradually axially forwardly in the first circumferential direction of the body, the leading insert of each segment being disposed adjacent the last trailing insert of another segment, the leading inserts of the respective segments having substantially the same axial and radial positions on the body.

2. The milling tool according to claim 1, wherein the inserts are arranged to cut more material in the axial direction than in the radial direction, the inserts arranged along a helical path on the body.

3. The milling tool according to claim 1, wherein each cutting insert disposed along at least one of a circumference of the body is provided at a shorter distance from the axis relative to an antecedent cutting insert in the same segment, the cutting inserts arranged at successively diminishing distances from a plane oriented perpendicular to the axis at the end surface.

4. The milling tool according to claim 1, wherein a revolution of the body, when observed with the axis in one and the same position, is positioned radially inwards by a first distance towards the axis as well as axially forwardly by a second distance, relative to an antecedent cutting insert in the direction of rotation.

5. The milling tool according to claim 1, wherein a leading cutting insert in the direction of rotation within a segment of the tool circumference is provided at a greatest distance from the rotational axis, and a trailing cutting insert in the direction of rotation in the same segment is provided at a smallest distance from the rotational axis.

6. The milling tool according to claim 5, wherein each cutting insert has a width, and the difference between the greatest distance and the smallest distance is smaller than the width of the cutting insert.

7. The milling tool according to claim 1, wherein axial distances between two adjacent cutting inserts of at least one group of the cutting inserts are equal.

8. A method of milling a work piece utilizing a milling tool comprising a milling body and a plurality of cutting inserts carried by the body, the body defining an axis of rotation and including circumferentially spaced pockets in which respective inserts are mounted; each pocket comprising at least one base surface; each insert having at least one cutting edge; wherein the cutting inserts disposed along at least one circumferential segment of the body are arranged in a helical path to, the inserts arranged successively in a first circumferential direction of the body and comprising more than two circumferentially successive inserts, the inserts including a leading insert and a last trailing insert with reference to the direction of rotation, the inserts becoming disposed gradually radially inwardly in the first circumferential direction and gradually axially forwardly in the first circumferential direction, wherein the inserts cut the work piece at successively diminishing distances from the axis, and at successively increasing distances toward the workpiece, the method comprising the steps of rotating the body about the axis while producing a relative feed between the body and the work piece in a direction perpendicular to the axis, the relative feed being at a rate for maintaining successive cutting inserts of the at least one segment at substantially the same radial position relative to the workpiece and at progressively advanced axial positions toward the workpiece, wherein the workpiece is machined substantially in the axial direction by the inserts of the at least one segment.

* * * * *